July 3, 1962

A. A. ANDERSON 3,042,358

VALVE WITH SPHERICAL CLOSURE

Filed Oct. 27, 1958

INVENTOR
ARTHUR A. ANDERSON
BY
John E. Stryker
ATTORNEY

United States Patent Office 3,042,358
Patented July 3, 1962

3,042,358
VALVE WITH SPHERICAL CLOSURE
Arthur A. Anderson, St. Paul, Minn., assignor to The Specialty Mfg. Co., St. Paul, Minn., a corporation of Minnesota
Filed Oct. 27, 1958, Ser. No. 769,788
5 Claims. (Cl. 251—172)

This invention relates to improvements in valves of the type having a rotary closure or barrier wall member formed with a spherical surface adapted to slidably engage a circular, resilient pressure seal ring embracing the outer periphery of a relatively unyielding seat which also fits in contact with the spherical barrier wall surface when the valve is closed.

It is an object of my invention to more effectively guard against leakage in a valve of the class described by providing means for compensating for ordinary inaccuracies in the location of the centers of the relatively movable parts including the position of the valve stem and barrier wall member relative to the center of the valve seat and axis of the bore defining the valve chamber.

A particular object is to provide in a valve of the class described a floating valve seat which is movable freely within a small but effective range in a plane which is approximately parallel to the axis of rotation of the valve stem so that the seat is moved by contact with the barrier wall member to positions where the seat accurately fits the spherical surface of the barrier wall.

A further object is to provide in a valve of the class described a barrier wall member having a seat contact surface of spherical segment form positioned at one side of a rotary valve stem and connected to the stem by means which permit limited movement of the barrier wall member relative to the stem, such movement being sufficient to compensate for ordinary inaccuracies in the location of the spherical barrier wall surface and the valve stem.

Other objects will appear and be more fully pointed out in the following specification and claims.

In the accompanying drawing showing one embodiment of my invention, by way of example and not for the purpose of limitation:

Figure 1:
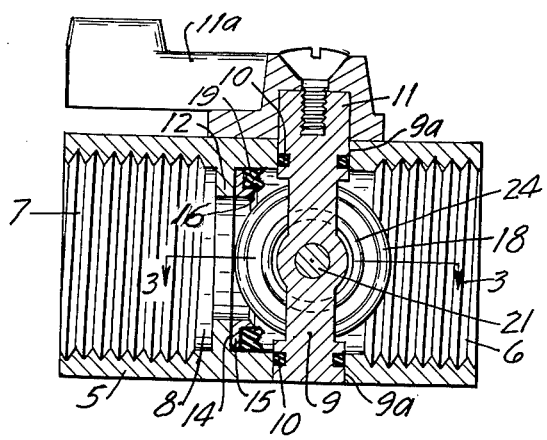
FIGURE 1 is a central longitudinal sectional view showing the valve in open position.
Figure 2:
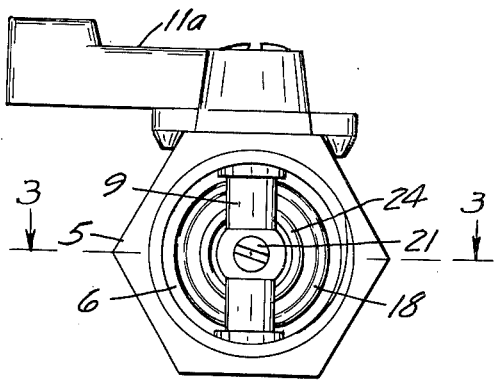
FIG. 2 is an end elevational view showing the valve in closed position.

As shown in the drawing, the valve has a tubular body 5, formed with an inlet passage 6, an outlet passage 7 and central chamber 8, defined by a longitudinally extending bore connecting the inlet and outlet passages. Bearing openings 9a for a stem indicated generally by the numeral 9 are formed in the body with the axis of the openings and stem approximately at a right angle to the axis of the chamber 8. This stem is adapted to be rotated about its longitudinal axis in the bearings 9a and is formed with annular grooves containing sealing rings 10 for sealing the bearing openings at the periphery of the stem. As shown, the rings 10 are O-rings of the fluid pressure sealing type. At one end the stem projects from the body 5 and is formed with an end portion 11 adapted to be secured to a handle 11a (FIG. 1) for turning the stem about its axis.

At the outlet side of chamber 8 a fixed annular abutment 12 is provided for a floating valve seat indicated generally by the numeral 13. This abutment has a radially extending stop surface 14 which is approximately parallel to the axis of the stem 9 and approximately perpendicular to the axis of chamber 8. Valve seat 13 is preferably L-shaped in cross section, as shown, and has an annular flange portion 15 of somewhat smaller outside diameter than the adjacent inside diameter of the chamber 8 so that the seat 13 is free for limited movement in contact with the stop surface 14 and in a plane which is approximately parallel to the axis of the stem 9. A right angularly projecting annular flange portion of the seat 13 is formed with a narrow concavely spherical contact zone 16 for engagement with a convexly spherical surface 17 of a barrier wall member 18.

Confined in the chamber 8 at the outer periphery of the floating seat 13 is a flexible and compressible sealing ring 19 having an annular edge portion 20 which projects to slidably engage the spherical surface 17 of the member 18. Annular edge portion 20 preferably has a narrow concavely spherical surface which fits in contact with the surface 17 adjacent to the spherical zone surface 16 of the valve seat 13. The latter is constructed from a relatively unyielding material such as a suitable metal or plastic material, e.g., a nylon plastic characterized by good wear-resistance and relatively slight resilience and compressibility in comparison with the sealing ring 19.

Sealing ring 19, as illustrated, has three rectangularly disposed sides for contact with the wall of chamber 8 and with the angle surfaces of the seat 13 respectively. The side of ring 19 which is exposed to fluid pressure in chamber 8 has a V-shaped groove and the spherical edge portion 20. An elastic, compressible sealing ring of this shape is particularly well adapted for use in a valve of the class described wherein fluid pressure is exerted on the exposed and extended face of the ring to cause the ring to be compressed against both of the angle surfaces of the seat 13 as well as the cylindrical surface of the chamber 8 and spherical surface of the barrier wall member 18 when the valve is closed. However, some of the advantages of this special pressure seal ring may be obtained by the use of a conventional "quad" type of seal ring.

Barrier wall member 18 is connected to the valve stem 9 by a stud 21 which projects at right angles to the axis of the stem 9. A reduced end portion 22 of the stud 21 fits loosely in a centrally located recess formed in the inner face of the barrier wall member 18. Such connecting means permit limited rocking movement of the barrier wall member relative to the stud to compensate for ordinary inaccuracies in angular position of the stem 9 relative to the axis of the chamber 8. A threaded connection between the stud 21 and stem 9 is provided and a kerf 23 in the accessible end of the stud facilitates the assembly of the valve and provides for adjustment of the spacing of the spherical surface 17 relative to the axis of the stem 9. Confined between the stem 9 and inner face of barrier wall member 18 is a helical spring 24 which biases the barrier wall member toward its seat 13 and sealing ring 19, thereby to maintain resilient, continuous contact between the surface 17 and seat 13.

Figure 3:
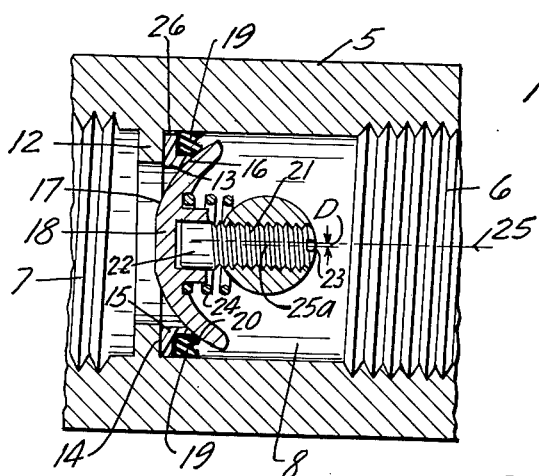
FIG. 3 is a fragmentary sectional view taken on the line 3—3 of FIG. 2, showing the valve in closed position and on a somewhat larger scale.

In FIG. 3 the adaptability of my improved valve to automatically compensate for ordinary inaccuracies in the location of the axis of the stem 9 relative to the axis of the chamber 8 is illustrated somewhat diagrammatically. In this view the axis of rotation of the stem 9 is indicated by the point 25a and the axis of the bore defining the chamber 8 is indicated by the broken line 25, this line being at one side of the axis 24 to show an error in location represented by a dimension D. This dimension is greatly enlarged for purposes of illustration. As further shown in FIG. 3, the seat 13 has been moved down so that its lower periphery contacts the wall of the chamber 8 and its upper periphery is spaced as indicated at 26 from the chamber wall. This compresses the sealing ring 19 at its lower periphery and allows it to expand at its upper periphery while maintaining continuous sealing contact with the spherical surface 17 of barrier wall member 18. Concavely spherical surface 16 of the seat 13 is thereby retained in accurately fitting, continuous engagement with the surface 17 of the barrier wall member, insuring leak-proof closing of the valve even when the axis of the stem is erroneously located at either side of the axis of chamber 8.

Ordinary inaccuracies in the location of the stem 9 are on the order of magnitude of .005 to .015 inch. Compensation for inaccuracies in spacing of the stem axis 24 relative to the abutment surface 14 may be made by adjusting the position of the stud 22 in its threaded bearing in the stem 9.

When the valve is in open position as well as when it is in closed or partially open position, a peripheral segment of the barrier wall member 18 remains in contact with the sealing ring 19 and seat surface 16. Rotary motion of the stem 9 is limited in the valve shown to an angle of approximately 90 degrees and the valve is moved from fully open to fully closed position when the stem is turned 90 degrees.

In the preferred embodiment of the invention illustrated and described in detail, the spherical barrier wall member 18 projects at one side only of the stem, but it will be evident that the advantages of the floating seat 13 are retained in a valve wherein the barrier wall member is a substantially complete sphere either integral with or having a fixed connection with the valve stem.

I claim:

1. A valve comprising, a tubular body having an elongated bore defining a chamber, inlet and outlet passages extending from said chamber, a fixed annular abutment for a valve seat at the outlet end of said bore, having a stop surface coaxially and perpendicularly disposed to the longitudinal axis of said bore, an annular floating valve seat movable radially in contact with said stop surface, the outside diameter of said seat being smaller than said bore and said seat having a concavely spherical seat surface, a barrier wall member having a convexly spherical surface for contact with said seat surface, a flexible and compressible sealing ring confined in said chamber at the outer periphery of said seat, the outer and inner peripheries of said sealing ring being in continuous contact with the inner and outer surfaces respectively of said bore and seat, and said sealing ring having an anular edge portion disposed to make sealing contact with the spherical surface of said barrier wall member when under fluid pressure, said tubular body being formed with a bearing opening for a stem having an axis of rotation extending approximately through the center of the sphere defined by said spherical surface of said barrier wall member and approximately parallel to said annular stop surface, a rotary stem fitting in said bearing, and means operatively connecting said stem to said barrier wall member for rotating said member across said sealing ring and spherical seat surface for opening and closing the valve, said floating seat being freely movable radially in contact with said stop surface to compensate for inaccuracies in the location of said stem in relation to the axis of said chamber and said sealing ring being operative to seal the joint between said floating seat and said bore.

2. A valve in accordance with claim 1 in which said floating valve seat is substantially L-shaped in cross section and said sealing ring fits in contact with the surfaces of said seat defining the inside angle thereof.

3. A valve in accordance with claim 1 in which said barrier wall member is a segment of a sphere positioned at one side of said stem and having a central recess in its side adjacent to the stem, and said means operatively connecting said stem to the barrier wall member comprises a stud projecting from a side of the stem, and fitting loosely in said recess whereby said barrier wall member is free for limited rocking movement on the projecting end of said stud.

4. A valve in accordance with claim 3 in which the stem has a tapped bore extending at a right angle to the axis thereof and said stud has a screw thread connection with said bore whereby the spacing of said barrier wall member relative to the axis of the stem may be adjusted by turning said stud in said bore.

5. A valve in accordance with claim 3 in which spring means are provided for biasing said barrier wall member toward said seat and sealing ring.

References Cited in the file of this patent

UNITED STATES PATENTS

| 1,784,381 | O'Stroske | Dec. 9, 1930 |
| 2,514,551 | Monroe | July 11, 1950 |
| 2,603,449 | Overholser | July 15, 1952 |
| 2,853,266 | Raleigh | Sept. 23, 1958 |
| 2,929,406 | Anderson | Mar. 22, 1960 |

FOREIGN PATENTS

| 753,860 | Great Britain | Aug. 1, 1956 |
| 759,218 | Great Britain | Oct. 17, 1956 |